(12) United States Patent
Ohtsuka

(10) Patent No.: US 7,496,641 B2
(45) Date of Patent: Feb. 24, 2009

(54) COMPUTER SYSTEM

(75) Inventor: Toshihiko Ohtsuka, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 287 days.

(21) Appl. No.: 11/586,034

(22) Filed: Oct. 25, 2006

(65) Prior Publication Data

US 2007/0130251 A1 Jun. 7, 2007

(30) Foreign Application Priority Data

Oct. 28, 2005 (JP) ............... 2005-314387

(51) Int. Cl.
*G06F 15/16* (2006.01)
(52) U.S. Cl. .............. 709/218; 709/230; 709/232; 709/203; 709/204; 714/47; 345/483
(58) Field of Classification Search .......... 709/218, 709/230, 232, 203, 204; 714/47; 345/483
See application file for complete search history.

(56) References Cited

FOREIGN PATENT DOCUMENTS

| JP | 2003-158534 A | 5/2003 |
|----|---------------|--------|
| JP | 2004-171063 A | 6/2004 |

*Primary Examiner*—Thanh Tammy Nguyen
(74) *Attorney, Agent, or Firm*—Frishauf, Holtz, Goodman & Chick, P.C.

(57) ABSTRACT

In a computer system in which a plurality of server units and a plurality of terminal units are connected via a network and application software is consolidated on the server units, each of the server units stores a specific file in which information on the connection with each of the plurality of server units, information on a desktop image corresponding to each of the plurality of server units, information on the specification of an application functioning on the server unit, and information on an image of its initial screen have been written, transmits the specific file to a connecting terminal unit as a result of the connection with the terminal unit, and runs the application when receiving from the terminal unit a run command for the application complying with information on the specification of the application functioning on the present server unit.

6 Claims, 17 Drawing Sheets

FIG.2

13a CONFIG SETTING FILE A

```
host:          (←IP ADDRESS OF HOST)
host01=192.168.0.20
host02=192.168.0.21
host03=192.168.0.22
host04=192.168.0.23
host05=192.168.0.24
host06=192.168.0.25 host01:
application:   (←APPLICATION NAME)
PowerPoint,IE,WindowsMediaPlayer,CALCULATOR protocol:
RDP,VNC shell:         (←PATH AND FILE NAME OF APPLICATION AT HOST)
IE=C:¥¥Program Files¥¥Internet" Explorer¥¥IEXPLORE.EXE"
WindowsMediaPlayer="C:¥¥Program Files¥¥Windows Media Player¥¥wmplayer.exe"
PowerPoint="C:¥¥Program Files¥¥Microsoft Office¥¥OFFICE11¥¥POWERPNT"
CALCULATOR="C:¥¥WINDOWS¥¥system32¥¥calc.exe"

uri:           (←IMAGE FILE OF HOST AND APPLICATION)
host01=http://192.168.0.20/desktop/screen_s00.jpg
host02=http://192.168.0.20/desktop/screen_s01.jpg
host03=http://192.168.0.20/desktop/screen_s02.jpg
host04=http://192.168.0.20/desktop/screen_s03.jpg
host05=http://192.168.0.20/desktop/screen_s04.jpg
host06=http://192.168.0.20/desktop/screen_s05.jpg IE=http://192.168.0.20/desktop/screen_s01.jpg
WindowsMediaPlayer=http://192.168.0.20/desktop/wmp_s01.jpg
PowerPoint=http://192.168.0.20/desktop/powerpoint_s01.jpg
CALCULATOR=http://192.168.0.20/desktop/cal_s01.jpg
```

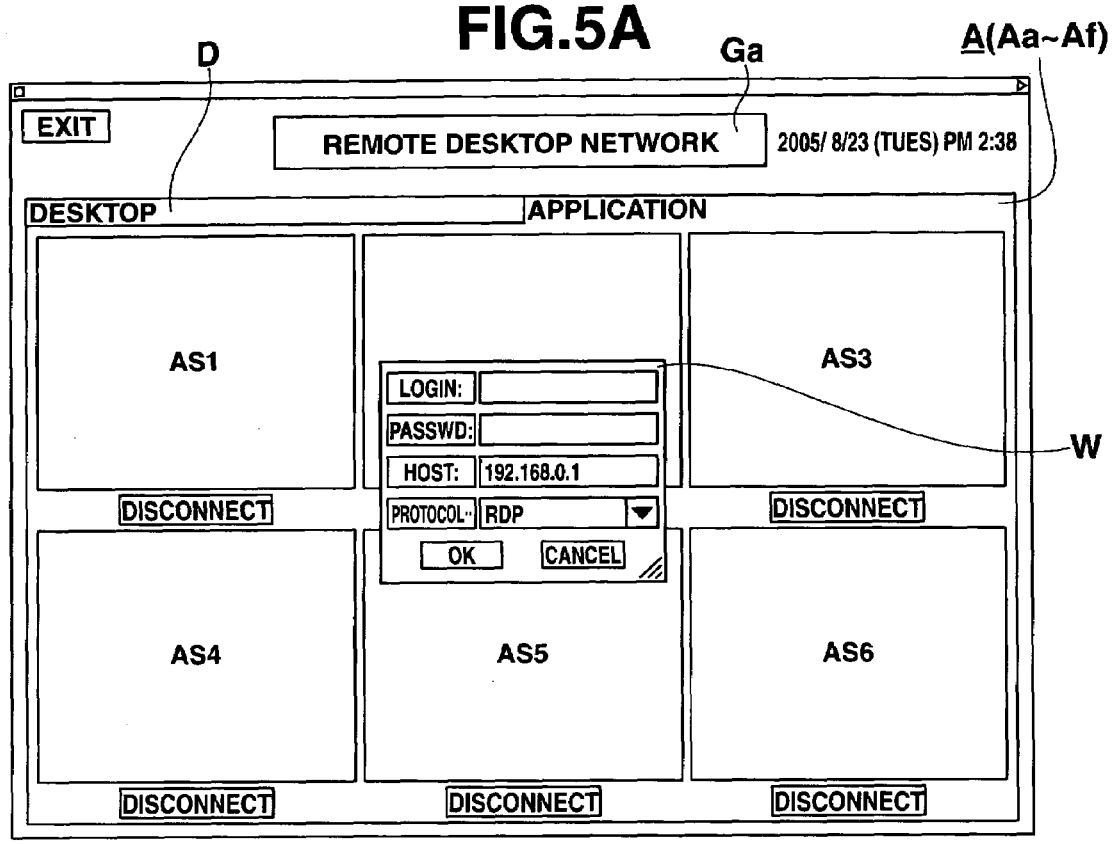
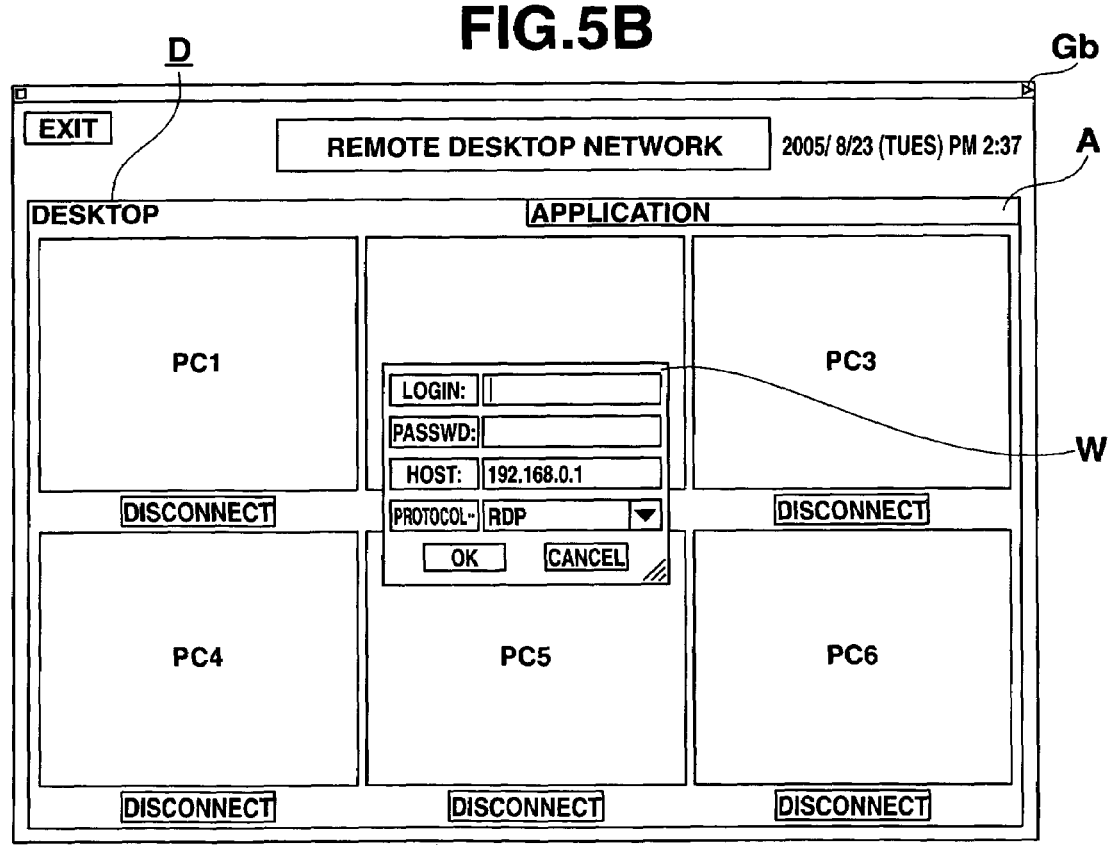

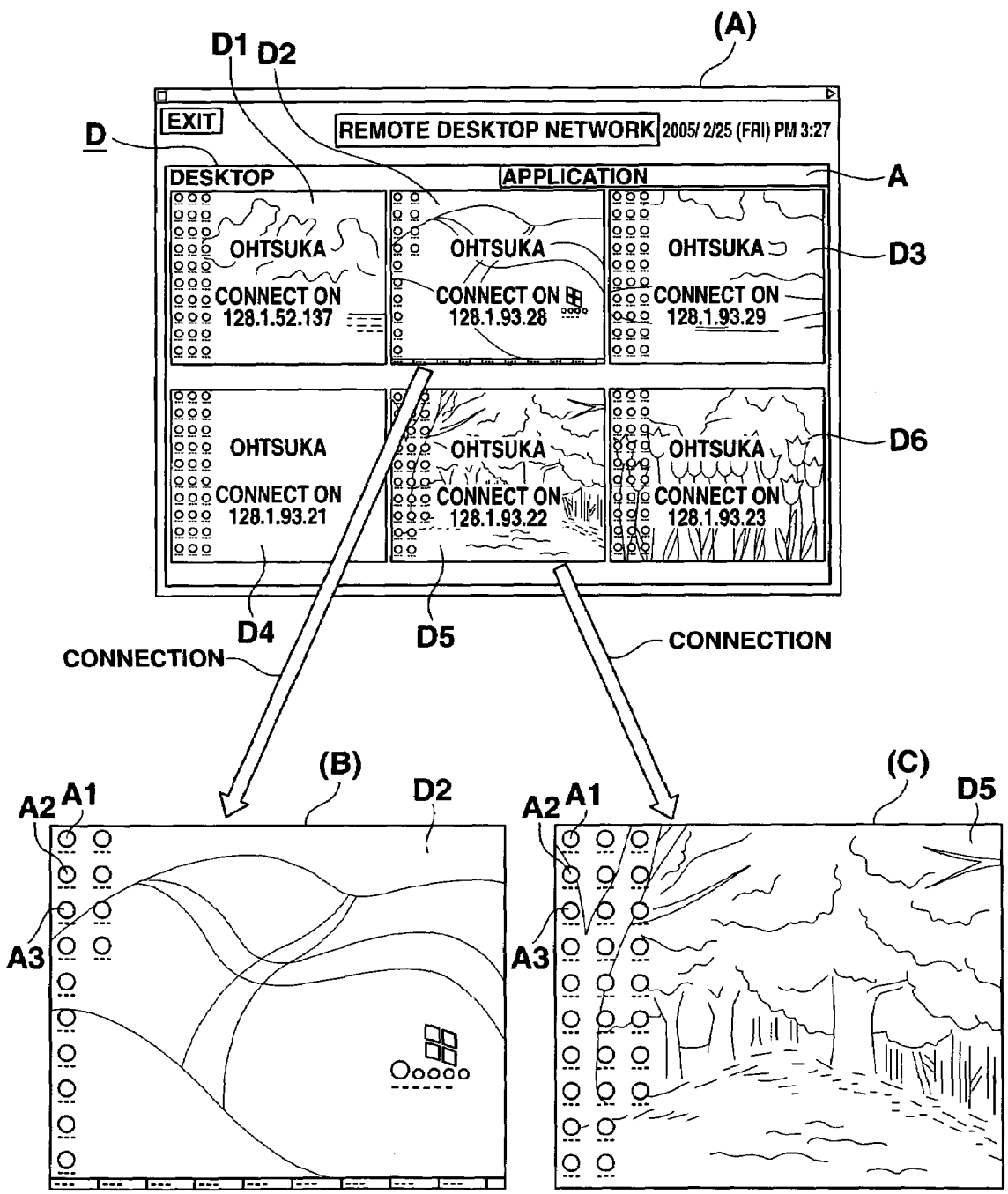

FIG.9

13a' CONFIG SETTING FILE ABC

```
host:
host01=192.168.0.20
host02=192.168.0.21
host03=192.168.0.22
host04=192.168.0.23
host05=192.168.0.24
host06=192.168.0.25 host01:
application:
PowerPoint,IE,WindowsMediaPlayer,CALCULATOR protocol:
RDP,VNC shell:
IE=C:¥¥Program Files¥¥Internet" Explorer¥¥IEXPLORE.EXE"
WindowsMediaPlayer="C:¥¥Program Files¥¥Windows Media Player¥¥wmplayer.exe"
PowerPoint="C:¥¥Program Files¥¥Microsoft Office¥¥OFFICE11¥¥POWERPNT"
CALCULATOR="C:¥¥WINDOWS¥¥system32¥¥calc.exe"

uri:
host01=http://192.168.0.20/desktop/screen_s00.jpg
host02=http://192.168.0.20/desktop/screen_s01.jpg
host03=http://192.168.0.20/desktop/screen_s02.jpg
host04=http://192.168.0.20/desktop/screen_s03.jpg
host05=http://192.168.0.20/desktop/screen_s04.jpg
host06=http://192.168.0.20/desktop/screen_s05.jpg IE=http://192.168.0.20/desktop/screen_s01.jpg
WindowsMediaPlayer=http://192.168.0.20/desktop/wmp_s01.jpg
PowerPoint=http://192.168.0.20/desktop/powerpoint_s01.jpg
CALCULATOR=http://192.168.0.20/desktop/cal_s01.jpg host02:
application:
    ⋮ host03:
application:
    ⋮
```

FIG.14

18a LOAD STATE MANAGEMENT FILE

| HOST IP ADDRESS | CPU LOAD | MEMORY SWAP | TRAFFIC | DISK USE | TOTAL | PRIORITY |
|---|---|---|---|---|---|---|
| 192.168.0.20 | 40 | 50 | 80 | 45 | 215 | 2 |
| 192.168.0.21 | 20 | 25 | 50 | 15 | 110 | 1 |
| 192.168.0.22 | 50 | 80 | 30 | 70 | 230 | 3 |

COMPUTER SYSTEM

CROSS-REFERENCE TO RELATED APPLICATIONS

This application is based upon and claims the benefit of priority from prior Japanese Patent Application No. 2005-314387, field Oct. 28, 2005, the entire contents of which are incorporated herein by reference.

BACKGROUND OF THE INVENTION

1. Field of the Invention

This invention relates to a computer system, such as a server-based computing (SBC) system, configured to cause all of the applications input and output at a client personal computer (PC) to run on a server and manage all of the created files on the server side in a client-server system connected via a network, such as a local area network (LAN).

2. Description of the Related Art

Each of the individual PC terminals connected to a network, such as an in-house LAN, runs a document creation application or a table creation application independently and creates various files. The various files are stored in the storage unit of the PC terminal or in an external storage medium, such as a magnetic disk, an optical disk, or a small semiconductor memory, or are transferred to and stored in a storage unit managed by a server on the network.

In such a conventional client-server system, since the created files are managed in each PC terminal itself, if the PC terminal has been lost or removed illegally and fallen into a third party's hands, there is a risk that the stored files might be read and important information or classified information might be leaked.

Moreover, when each PC terminal runs the application independently, the work of updating, changing, and adding the application has to be done on a PC terminal basis, making management troublesome, which results in an increase in the cost.

To overcome this drawback, a recent client-server system has introduced a server-based computing (SBC) system (thin client system) configured to run all the applications input and output at each PC terminal (or client PC) and manage all the resulting created files on the server side.

With the SBC system, since the application process is carried out, the resulting files are managed on the server side according to the input operation on the PC terminal, and only the resulting display screen data is transferred in bitmap form to the PC terminal which then displays the data, none of the data produced by the application process on the server side is left on the PC terminal side and the PC terminal just functions as an input/output terminal. Even if the PC terminal has been lost or removed illegally and fallen into a third party's hands, none of the files are read out, making the client-server system very effective in terms of security.

Moreover, the work of updating, changing and adding the applications has only to be done on the server alone, making the management very easy, which is beneficial.

In such an SBC system, however, since the load on the server inevitably increases, the number of PC terminals one server manages is limited. For example, a server is installed in each section on a department and section basis on an in-house LAN.

In this case, it is inevitable that the PC terminal side will request not only to connect to a server in the section to which the PC terminal belongs and use an application functioning on the server but also to connect to one other server and use an application functioning on the one other server.

In the conventional SBC system, however, to connect one of the system's own PC terminals to the desired server, it is necessary to specify and input an IP address, connection information on the desired server. For this reason, the user must know the IP addresses of all the servers on the network.

There is still another problem: each time the user selects and uses an application on each server, the user has to specify and input the IP address of each server to connect with the server again.

BRIEF SUMMARY OF THE INVENTION

It is an object of the present invention to provide a computer system which enables the applications on each server to be used freely by switching to an arbitrary server easily without the need to know connection information on the other servers on the network in advance.

According to an aspect of the present invention, there is provided a computer system in which a plurality of server units and a plurality of terminal units are connected via a network and application software is consolidated on the server units, each of the server units comprising: specific file storage means for storing a specific file in which information on the connection with each of said plurality of server units, information on a desktop image corresponding to each of said plurality of server units, information on the specification of an application functioning on the server unit, and information on an image of its initial screen have been written; specific file transmitting means for transmitting the specific file stored by the specific file storage means to a connecting terminal unit as a result of the connection with the terminal unit; and application running means for running the application when receiving from the terminal unit a run command for the application complying with information on the specification of the application functioning on the present server unit, and each of the terminal units comprising: specific file reception storage means for storing a specific file received in response to the connection with the server unit; desktop list display control means for displaying, in list form, desktop images corresponding to said plurality of server units in a one-to-one correspondence on the basis of the description of the specific file stored by the specific file reception storage means; connection command transmitting means for, when the desktop images corresponding to said plurality of server units in a one-to-one correspondence displayed in list form by the desktop list display control means are specified according to the user operation, transmitting a connection command to the server unit according to connection information on the server unit written in the specific file stored by the specific file reception storage means in compliance with the specified desktop image; application list display control means for displaying, in list form, initial screen images of the application functioning on the server unit on the basis of the description of the specific file stored by the specific file reception storage means; and run command transmitting means for, when the initial screen images of the application displayed in list form by the application list display control means are specified according to the user operation, transmitting a run command for the application to the server unit according to information on the specification of the application written in the specific file stored by the specific file reception storage means in conformity to the initial screen image of the specified application.

With the computer system of the invention, the terminal user can connect directly with a server unit without knowing connection information on the server unit just by selecting and specifying the corresponding one of the desktop images of the individual server units displayed in list form.

Furthermore, the terminal user can directly run and use an application without knowing specification information, including the storage location of the application, just by selecting and specifying an initial screen image of the applications displayed in list form.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 shows the contents of a config setting file (A)13a included in a server unit (A)11a of the SBC system according to the first embodiment;

FIG. 5A shows a terminal initial screen Ga with application tab A selected resulting from a client-server connection control process in the SBC system;

FIG. 5B shows a terminal initial screen Gb with desktop tab D selected resulting from a client-server connection control process by the SBC system;

FIG. 6 shows a desktop selection screen (D1 to D6) resulting from a client-server connection control process in the SBC system and desktop screens Dn after the selective connection;

FIG. 9 shows the contents of a config setting file (A)13a' included in a server unit (A)11a of the SBC system according to the second embodiment;

FIG. 14 shows the contents of a load state management file 18a included in a server unit (A)11a of the SBC system according to the third embodiment;

DETAILED DESCRIPTION OF THE INVENTION

Hereinafter, referring to the accompanying drawings, embodiments of the present invention will be explained.

First Embodiment

Figure 1:
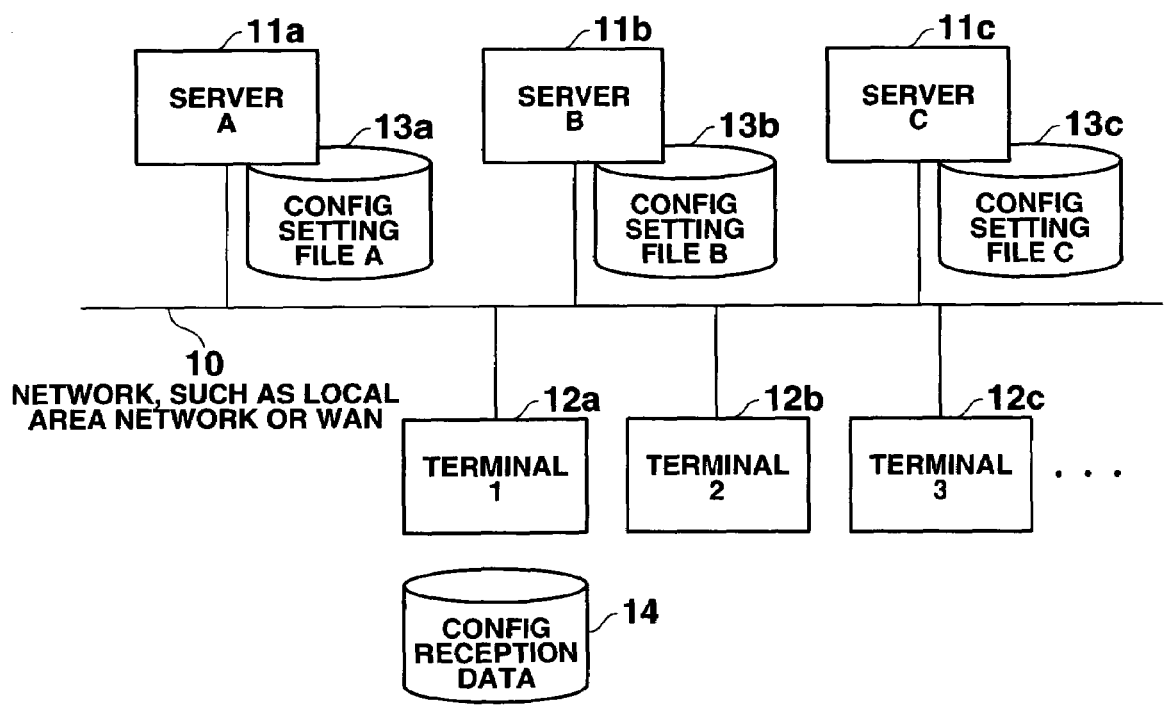
FIG. 1 is a block diagram showing the configuration of a server-based computing (SBC) system according to a first embodiment of a computer system of the present invention.

FIG. 1 is a block diagram showing the configuration of a server-based computing (SBC) system according to a first embodiment of a computer system of the present invention.

The SBC system comprises a plurality of server units (A)11a, (B)11b, . . . and a plurality of client terminals (1)12a, (2)12b, . . . caused to correspond to the server units (A)11a, (B)11b, . . . , respectively, connected to a network 10, such as a local area network (LAN) or wide area network (WAN).

In the SBC system of the first embodiment, the number of client terminals 12 on the network 10 mostly handled by each of the server units (A)11a, (B)11b, . . . is set to 3. The main (initial) destination of each of the client terminals (1)12a to (3)12c is the server unit (A)11a. The main (initial) destination of each of the client terminals (4)12d to (6)12f (not shown) is the server unit (B)11b. The main (initial) destination of each of the client terminals (7)12g to (9)12g (not shown) is the server unit (C)11c.

Each of the server units (A)11a, (B)11b, . . . has a plurality of application programs, including a document creating program, a spreadsheet program, a mail handling program, an Internet connection program, and a Web browser display program, and is activated according to the operation input signal from the client terminals (1)12a, (2)12b, . . . connected to the respective server units (A)11a, (B)11b, . . . and executes the process.

In the server units (A)11a, (B)11b, . . . , the display output screens resulting from the execution of the application programs according to the operation input signals from the client terminals (1)12a, (2)12b, . . . are transmitted as bitmap data to the accessing client terminals (1)12a, (2)12b, . . . , which display the data on their terminal display sections.

That is, each of the client terminals (1)12a, (2)12b, . . . in the SBC system has only an input function according to the user operation, such as a keyboard or a mouse and an output function, such as an LCD section a printer, but doesn't have any data file management function.

Then, the data files created in various processes executed at the server units (A)11a, (B)11b, . . . according to the operation input signals from the client terminals (1)12a, (2)12b, . . . are stored by user account or in the form of common files into the server units (A)11a, (B)11b, . . . or into storage units, such as magnetic disks, connected and managed by the server units (A)11a, (B)11b, . . . .

Moreover, the server units (A)11a, (B)11b, . . . in the SBC system have stored config setting files (A)13a, (B)13b, . . . .

FIG. 2 shows the contents of a config setting file (A)13a included in the server unit (A)11a of the SBC system according to the first embodiment.

In the config setting file (A)13a included in the server unit (A)11a, the following are stored beforehand as shown in FIG. 2: 1) IP addresses [host01=192.168.0.20] [host02=192.168.0.21] . . . [host06=192.168.0.25] of the individual Hosts, connection information on the individual server units (A)11a, (B)11b, . . . , (F)11f on the network 10, 2) Application name [application: . . . ] given to the present server unit (A)11a [host01], 3) Communication protocol [protocol:RDP (Remote Desktop Protocol), VNC (Virtual Network Computing)] of the present server unit (A)11a [host01], 4) Path and file name [shell: . . . ] of each application given to the present server unit (A)11a [host01], 5) Desktop image files of the individual server units (A)11a, (B)11b, . . . , (F)11f on the network 10 [uri:[host01=http://192.168.0.20/desktop/screen_s00.jpg][host02=http://192.168.0.20/desktop/screen_s01.jpg] . . . [host06=http://192.168.0.20/desktop/screen_s05.jpg], 6) an initial (desktop) image file of each application provided in the present server unit (A)11a [host01].

When the config setting file (A)13a included in the server unit (A)11a is accessed by the client terminals (1)12a to (3)12c whose main destination is the server unit (A)11a, the config setting file (A)13a is transmitted to the accessing client terminals (1)12a to (3)12c and is stored as config reception data 14 into the storage units in the client terminals (1)12a to (3)12c.

Like the server unit (A)11a with the config setting file (A)13a, the server unit (B)11b is provided with a config setting file (B)13b in which the following have been stored: 1) IP addresses[host: . . . ] of the individual hosts, connection information on the individual server units (A)11a, (B)11b, . . . , (F)11f on the network 10, 2) Application name [application: . . . ] given to the server unit (B)11b [host02], 3) Communication protocol [protocol: . . . ] of the present server unit (B)11b [host02], 4) Path and file name [shell: . . . ] of each application given to the present server unit (B)11b [host02], 5) Desktop image files [uri: . . . ] of the individual server units (A)11a, (B)11b, . . . , (F)11f on the network 10, 6) Desktop image file of each application provided in the present server unit (B)11b [host02].

Similarly, the other server units (C)11c, are provided with a config setting file (C)13c, . . . , respectively, in advance.

Specifically, for example, when connecting to the server unit (A)11a and then receiving the config setting file (A)13a and storing it as config reception data 14, the client terminal 12a can display, in list form, the desktop image files [uri: [host01=http://192.168.0.20/desktop/screen_s00.jpg] [host02=http://192.168.0.20/desktop/screen_s01.jpg] . . . [host06=http:192.168.0.20/desktop/screen_s05.jpg] of the server units (A)11a, (B)11b, . . . , (F)11f written in the config reception data 14 on a desktop selection screen (D1 to D6: see FIG. 6(A)) for connection to the individual server units (A)11a, (B)11b, . . . , (F)11f. The client terminal 12a can further connect to one of the server units (A)11a, (B)11b, . . . , (F)11f corresponding to a desktop screen Dn selected by specifying IP address [host: . . . ] of the Host according to the select operation on the desktop selection screen (D1 to D6: see FIG. 6(A)). The client terminal 12a can further display a desktop image of each application provided in the server unit (A)11a [host01] in list form on an application selection screen (A1 to A6: see FIG. 7(A)) for selecting an application to be used. The client terminal 12a can further run the application selected by specifying the path and file name [shell: . . . ] of the application according to the select operation on the application selection screen (A1 to A6: see FIG. 7(A)).

Next, a client-server connection control process in the server-based computing (SBC) system of the first embodiment configured as described above will be explained.

Figure 3:
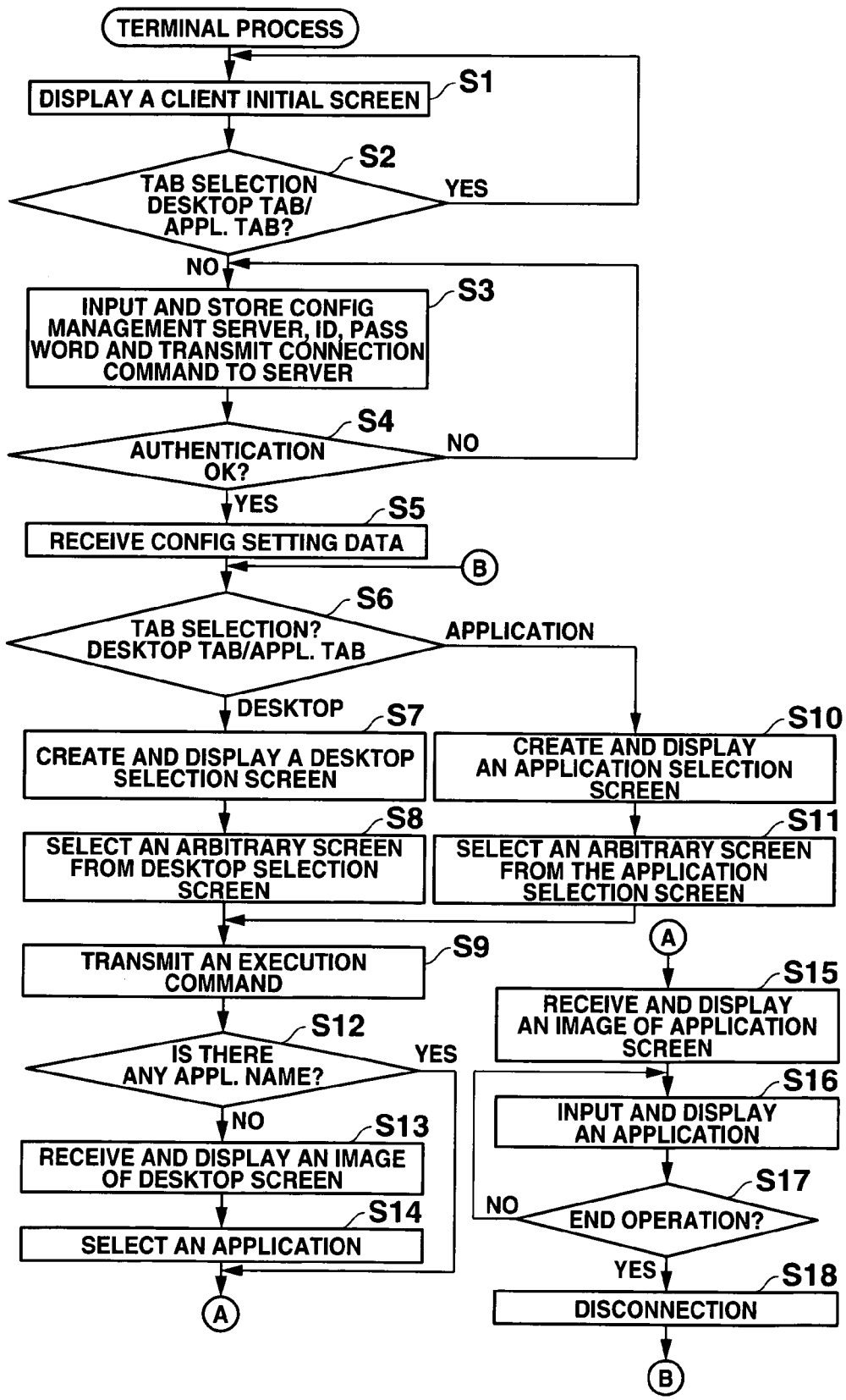
FIG. 3 is a flowchart to help explain a terminal process accompanying client-server connection in the SBC system of the first embodiment.

FIG. 3 is a flowchart to help explain a terminal process accompanying client-server connection in the SBC system of the first embodiment.

Figure 4:
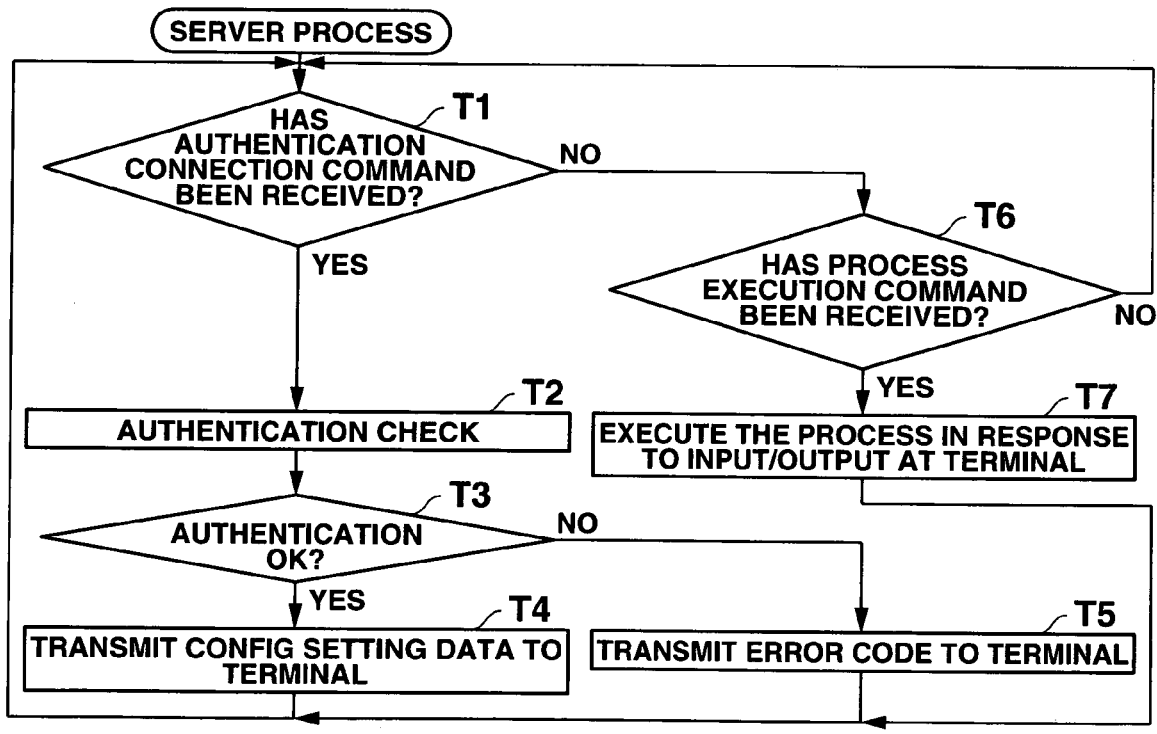
FIG. 4 is a flowchart to help explain a server process accompanying client-server connection in the SBC system of the first embodiment.

FIG. 4 is a flowchart to help explain a server process accompanying client-server connection in the SBC system of the first embodiment.

FIG. 5A shows a terminal initial screen Ga with application tab A selected resulting from a client-server connection control process in the SBC system.

FIG. 5B shows a terminal initial screen Gb with desktop tab D selected resulting from a client-server connection control process in the SBC system.

FIG. 6 shows a desktop selection screen (D1 to D6) resulting from a client-server connection control process in the SBC system and desktop screens Dn after the selective connection.

Figure 7:
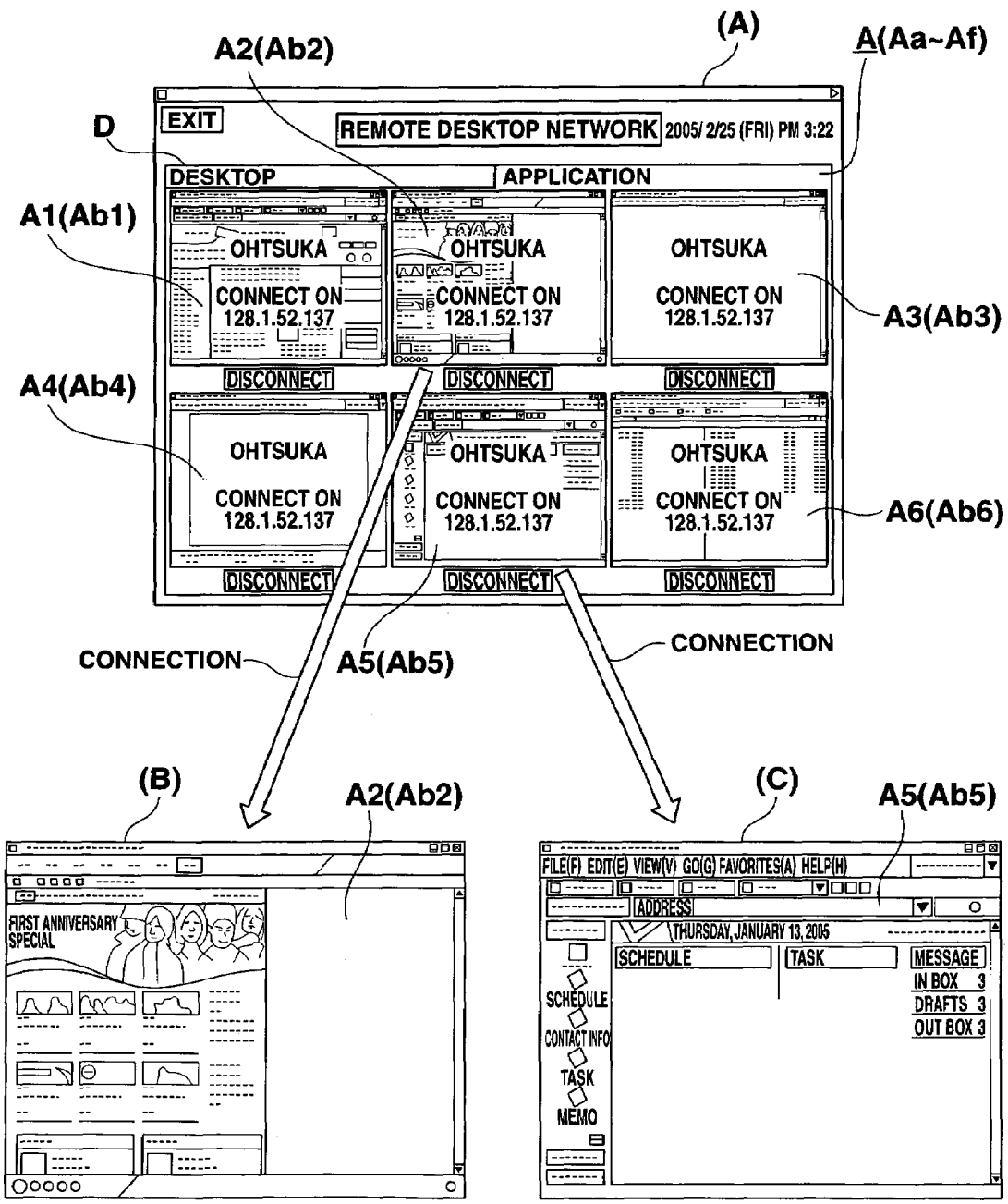
FIG. 7 shows an application selection screen (A1 to A6) resulting from a client-server connection control process in the SBC system and application screens An after the selective connection.

FIG. 7 shows an application selection screen (A1 to A6) resulting from a client-server connection control process in the SBC system and application screens An after the selective connection.

For example, in a case where the user registered in the network 10 of the SBC system does work using the client terminal (1)12a, when the power supply of the client terminal (1)12a is turned on, the terminal initial screen Ga (or Gb) is displayed as shown in FIG. 5A or FIG. 5B, prompting the user to input user account [LOGIN:], password [PASSWD:], host IP address [HOST:], communication protocol [PROTOCOL:] to an authentication input window W superimposed on the terminal initial screen Ga (or Gb) (step S1).

At this time, when the desktop tab D has been selected and specified, for example, the terminal initial screen Gb showing the selection images PC1 to PC6 of the six server units (A)11a, (B)11b, . . . , (F)11f is displayed as shown in FIG. 5B. When the application tab A has been selected and specified, for example, the terminal initial screen Ga showing the selection images AS1 to AS6 of the six applications is displayed as shown in FIG. 5A (step S2 → step S1).

Then, when the user inputs a user account [LOGIN:], password [PASSWD:], host IP address [HOST:], communication protocol [PROTOCOL:] to the authentication input window W on the terminal initial screen Ga (or Gb) and clicks "OK", the user account [LOGIN:] and password [PASSWD:] are stored and then these items of authentication data, together with a connection command making an authentication request, are transmitted to the server unit (A)11a at the specified host IP address (step S3).

When the server unit (A)11a has received the connection command with an authentication request transmitted from the client terminal (1)12a (step T1), it is determined whether the authentication is acceptable or unacceptable, on the basis of the previously registered user account [LOGIN:] and password [PASSWD:] (step T2). If it has been determined that the authentication is acceptable, the config setting file (A)13a shown in FIG. 2 is read and transmitted to the accessing client terminal (1)12a (step T3 → step T4).

When the client terminal (1)12a has received the config setting file (A)13a transmitted from the server unit (A)11a and stored it as config reception data 14 (step S5), it is determined whether the desktop tab D or application tab A has been selected on the present display screen (step S6).

If it has been determined that the desktop tab D has been selected as shown in FIG. 5B, for example, the desktop image files [uri:[host01=http://192.168.0.20/ desktop/screen_s00.jpg][host02=http://192.168.0.20/ desktop/screen_s01.jpg] ... [host06=http://192.168.0.20/ desktop/screen_s05.jpg] of the six server units (A)11a, (B)11b, ..., (F)11f stored as config reception data 14 (see FIG. 2) are read and displayed in list form on a desktop selection screen (D1 to D6) as shown in FIG. 6(A) (step S6 → step S7).

When the user has operated to select and specify, for example, desktop screen D2 on the desktop selection screen (D1 to D6) (step S8), a connect execution command is transmitted to the server unit (B)11b according to host IP address [host02=192.168.0.21] of the server unit (B)11b read from the config reception data 14 (see FIG. 2) according to image file [host02=http://192.168.0.20/desktop/screen_s01.jpg] on the desktop screen D2 (step S9).

Then, when the server unit (B)11b has received the connect execution command transmitted from the client terminal (1)12a (step T6), data on the desktop screen in the server unit (B)11b is transmitted to the client terminal (1)12a (step T7).

Then, the client terminal (1)12a displays the desktop screen D2 received from the server unit (B)11b corresponding to the desktop screen selected by the user as shown in FIG. 6(B) (step S12 → step S13).

In the SBC system, for example, when the client terminal (1)12a makes an initial connection to the server unit (A)11a, the connect execution command, together with an authentication request including user account [LOGIN:] and user password [PASSWD:], is transmitted (steps S1 to S4), followed by a connect authentication process (steps T1 to T5) on the server unit (A)11a side. Thereafter, when a connect execution command is transmitted to another server unit (n)11n according to desktop selection on the desktop selection screen (D1 to D6) (steps S6 to S9), for example, an authentication request is not transmitted because of the same network 10 and another server unit (n)11n which has received the connect execution command omits the authentication process and immediately carries out the process of dealing with the command. However, even on the same network 10, a connect execution command to which an authentication request including user account [LOGIN:] and user password [PASSWD:] stored in step S3 may be transmitted each time the connection is switched to another server unit (n)11n, and an authentication process may be carried out at the destination server unit (n)11n.

On the desktop screen D2 (see FIG. 6(B)) from the server unit (B)11b displayed at the client terminal (1)12a, when an arbitrary application A1, A2, ... on the screen has been selected and input (step S14), the initial screen of the selected application received from the server unit (B)11b is displayed in response to the transmission of the selected input signal of the application An to the server unit (B)11b (step S15).

Then, when the user has performed an input operation corresponding to the function of the application according to the application screen received and displayed at the client terminal (1)12a, a display screen corresponding to the user operation received from the server unit (B)11b is displayed in response to the transmission of the input operation signal to the server unit (B)11b (step T6 → step T7) (step S16), which enables the user to execute an arbitrary application.

At this time, the server unit (B)11b executes a process corresponding to the execution command each time the user performs an operation input at the accessing client terminal (1)12a and then display screen data corresponding to each process is transmitted to the client terminal (1)12a (step T6 → step T7).

Thereafter, at the client terminal (1)12a, when the user has operated to end the application process which has been executed by the accessed server unit (B)11b (step S17), the server unit (B)11b executes the process of cutting the connection with the client terminal (1)12a in response to the end operation signal (step T6 → step T7). Then, the client terminal (1)12a is disconnected from the server unit (B)11b (step S18).

As described above, even the client terminal (1)12a whose initial destination is the server unit (A)11a can be selectively connected easily to the desired one of the server units (A)11a to (F)11f according to the desktop selection screens (D1 to D6) corresponding to the server units (A)11a to (F)11f on the network 10 acquired from the reception data 14 (see FIG. 2) in the config setting file (A)13a and can activate an application functioning on the selected server unit to execute the corresponding process.

On the other hand, if in step S6, it has been determined that the application tab A has been selected as shown in FIG. 5A, the initial (desktop) image file of each application functioning on the server unit (A)11a [host01] stored as config reception data 14 (see FIG. 2) is read out and is displayed in list form on application selection screen (A1 to A6) as shown in, for example, FIG. 7(A) (step S6 → step S10).

On the application selection screen (A1 to A6), when the user has operated to select and specify, for example, the application screen A2 (step S31), a run command for the application is transmitted to the server unit (A)11a according to the path and file name [shell:] of the application read from the config reception data 14 (see FIG. 2) on the basis of the image file on the application screen A2 (step S9).

Then, in response to the transmission of a run command for the application A2 to the server unit (A)11a (step T6 → step T7), the initial screen for the selected application A2 received from the server unit (A)11a is received and displayed as shown in FIG. 7(B) (step S15).

Then, when the user has performed an input operation corresponding to the function of the application according to the application screen A2 received and displayed at the client terminal (1)12a, a display screen corresponding to the user operation received from the server unit (A)11a (step S16) is displayed in response to the transmission of the input operation signal to the server unit (A)11a (step T6 → step T7), thereby enabling the user to carry out an arbitrary application process.

At this time, the server unit (A)11a carries out a process corresponding to the run command each time the user performs an input operation at the accessing client terminal (1)12a, and display screen data corresponding to each process is transmitted to the client terminal (1)12a (step T6 → step T7).

Thereafter, when the client terminal (1)12a has operated to end the application process (A2) which has been executed by the accessed server unit (A)11a (step S17), the server unit (A)11a executes the process of cutting the connection with the client terminal (1)12A in response to the end operation signal (step T6 → step T7). Then, the client terminal (1)12a is disconnected from the server unit (A)11a (step S18).

As described above, a desired application An is just selected and specified according to the application selection screen (A1 to A6) composed of a list of the individual application initial screens acquired from the reception data 14 (see FIG. 2) in the config setting file (A)13a resulting from the connection with the server unit (A)11a at the initial destination, which makes it possible to easily activate the selected application An to execute the corresponding process.

Accordingly, in the process of controlling client-server connection in the SBC system of the first embodiment configured as described above, in a plurality of server units (A)11a, (B)11b, ... on the network 10, such as an in-house LAN, each being provided for a specific number of client terminals (1)12a, (2)12b, . . . , there are provided config setting files (A)13a, (B)13b, . . . in which the IP address and desktop image file of each of the server units (Host) (A)11a, (B)11b, . . . , a communication protocol for the server, and the application name, its path name, file name, and desktop image file the server unit itself has are stored beforehand. When the client terminals (1)12a, (2)12b, . . . access the server unit, the server unit transmits the config setting files (A)13a, (B)13b, . . . to the accessing client terminals (1)12a, (2)12b, . . . and causes the accessing client terminals (1)12a, (2)12b, . . . to store the files. Then, on the basis of the contents of the config reception data 14 received from the destination server units (A)11a, (B)11b, . . . , the client terminals (1)12a, (2)12b, . . . display a desktop image of a selection list screen (D1 to D6) corresponding to the server units (A)11a, (B)11b, . . . , specify the IP address of the Host corresponding to the desktop image Dn selected by the user, thereby connecting with the server unit (n)11n. Furthermore, the client terminals (1)12a, (2)12b, . . . display a desktop image of a selection list screen (A1 to A6) of each application and specify the path and file name corresponding to the desktop image An of the application selected by the user, thereby activating the application An. Accordingly, not only can the applications the initial destination server units (A)11a, (B)11b, . . . have be activated by directly specifying the path and file name on the selection list screen (A1 to A6) without inputting each path and file name, but also the other server units (A)11a, (B)11b, . . . on the network 10 can be directly specified on a desktop image of a selection list screen (D1 to D6) without inputting the IP addresses again, thereby connecting with the server units for use.

While in the first embodiment, the application name, path, and file name, and desktop image file of the application included in the server units (A)11a, (B)11b, . . . have written as information about the applications written in the config setting files (A)13a, (B)13b . . . included in the individual server units (A)11a, (B)11b, . . . . As explained in a second embodiment of the present invention, the application name, path, file name, and desktop image file may be written for each of the server units (A)11a, (B)11b, . . . with respect to all the applications the individual server units (A)11a, (B)11b, . . . have. In this case, there is provided a synchronizing function that causes the work of updating the applications independently in the individual server units (A)11a, (B)11b, . . . to be reflected in the config setting files (A)13a', (B)13b', . . . of all the server units (A)11a, (B)11b, . . . .

Second Embodiment

Figure 8:
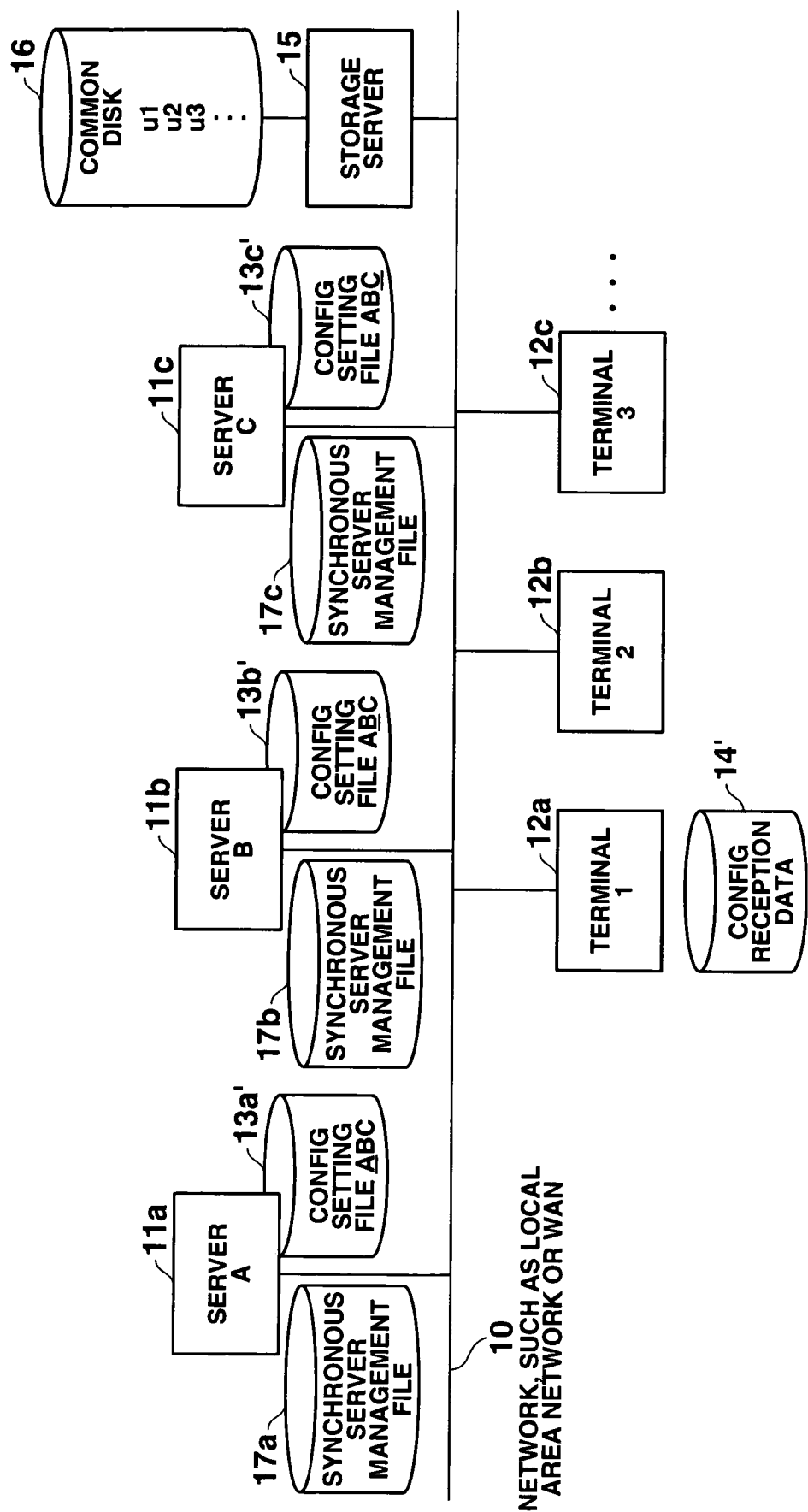
FIG. 8 is a block diagram showing the configuration of an SBC system according to a second embodiment of a computer system of the present invention.

FIG. 8 is a block diagram showing the configuration of an SBC system according to a second embodiment of a computer system of the present invention.

In the SBC system of the second embodiment in FIG. 8, the same component parts as those of the SBC system of the first embodiment in FIG. 1 are indicated by the same reference numerals and an explanation of them will be omitted.

In the SBC system of the second embodiment, the server units (A)11a, (B)11b, . . . on the network 10 are provided with config setting files (A)13a', (B)13b', . . . which have the same descriptive content, respectively. The descriptive content is always synchronized at the server unit specified in synchronous server management files 17a, 17b, . . . for the respective server units (A)11a, (B)11b, . . . .

FIG. 9 shows the contents of a config setting file (A)13a' included in a server unit (A)11a of the SBC system according to the second embodiment.

The config setting file (A)13a' of the second embodiment is such that not only information (including the application name, path and file name, desktop image file) about the application the server unit (A)11a including the file (A)13a but also information (the application name, path and file name, desktop image file) about the applications the other server units (B)11b, (C)11c, . . . on the same network 10 have are written as [host02:application: . . . ][host03: application: . . . ] . . . in the config setting file (A) 13a of the first embodiment.

The config setting files (B)13b', (C)13c', . . . included in the server units (B)11b, (C)11c, . . . respectively have the same descriptive content, except that information about the applications the server units (B)11b, (C)11c, . . . including the setting files (B)13b', (C)13c' is written at the beginning of the content.

Since the descriptive content of the config setting files (A)13a', (B)13b', . . . included in the server units (A)11a, (B)11b, . . . respectively are synchronized at specific intervals of time by the server unit specified in the synchronous server management files 17a, 17b, . . . for each server unit, the contents of update, such as addition, deletion, or change, of each application in the individual server units (A)11a, (B)11b, . . . can be reflected in the config setting files (A)13a', (B)13b', . . . included in all the server units (A)11a, (B)11b, . . . .

Figures 10, 11:
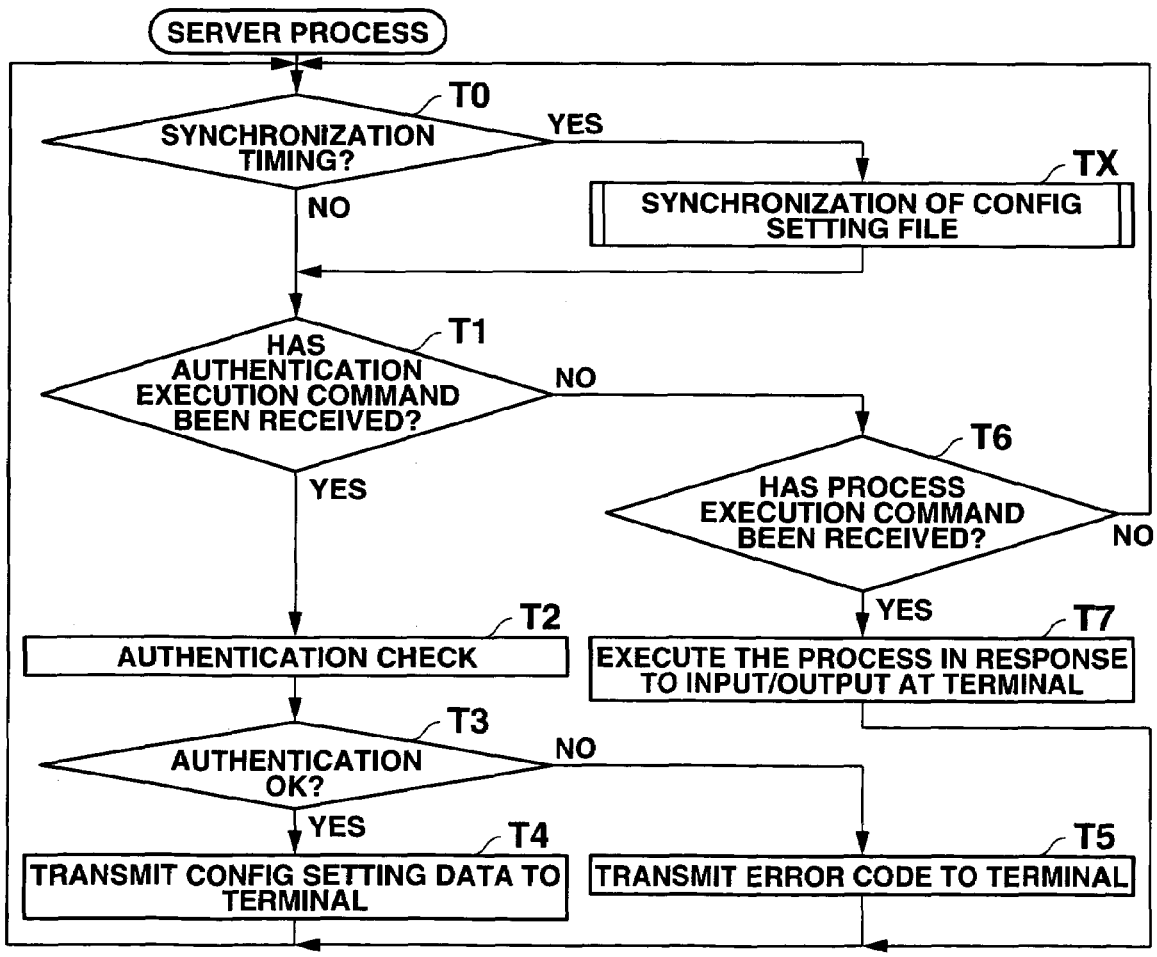
FIG. 10 shows the contents of a synchronous server management file 17a included in a server unit (A)11a of the SBC system according to the second embodiment.
FIG. 11 is a flowchart to help explain a server process accompanying client-server connection in the SBC system of the second embodiment.

FIG. 10 shows the contents of a synchronous server management file 17a included in the server unit (A)11a of the SBC system according to the second embodiment.

In the synchronous server management file 17a included in the server unit (A)11a, host type flags are set and stored. The host type flags set the server unit (A)11a to "1" and the other server units (B)11b, (C)11c, . . . to "0" according to the IP addresses (host IP addresses) corresponding to the individual server units (A)11a, (B)11b, . . . on the same network 10.

Each of the server units (A)11a, (B)11b, . . . receives the config setting files the other server units have according to the respective synchronous server management files 17a, 17b, . . . , and updates and synchronizes its own config setting file.

Specifically, when the client terminals (1)12a, (2)12b, . . . make an initial connection with the respective server units (A)11a, (B)11b, . . . , the server unit (A)11a, (B)11b, . . . transmit the config setting files (A)13a', (B)13b', . . . the server unit (A)11a, (B)11b, . . . have to its client terminal (n)12n and causes the terminal to store the files as config reception data 14'. By doing this, the client terminal (n)12n can not only display a desktop image of a selection list screen (D1 to D6) (see FIG. 6) for each of the server units (A)11a to (F)11f on the same network 10 and directly specify and connect to the server units (A)11a to (F)11f as in the SBC system of the first embodiment, but also display a selection list screen (A1 to An) (see FIG. 7) of the applications the server units (A)11a to (F)11f have and directly specify, connect, and activate the applications of the server units (A)11a to (F)11f.

In this case, the selection list screen (A1 to An) of the applications caused to correspond to the server units (A)11a to (F)11f is displayed so as to be switchable by, for example, providing application tabs Aa to Af for the respective server units (A)11a to (F)11f.

On the network 10 of the SBC system of the second embodiment, a storage server 15 is connected and a common disk 16 is provided. Then, various data files created by executing the applications of the server units (A)11a, (B)11b, . . . from the client terminals (1)12a, (2)12b, . . . are collectively stored and managed at the common disk 16 for each of the user accounts u1, u2 . . . .

As described above, collectively managing the data files on the network 10 for each of the user accounts u1, u2, . . . makes it possible to store and manage the data files of the same user created by running applications of the same type as a common data file even in the different server units (A)11a, (B)11b, . . . .

Next, the process of controlling the client-server connection in the SBC system of the second embodiment will be explained.

FIG. 11 is a flowchart to help explain a server process accompanying client-server connection in the SBC system of the second embodiment.

The processes in step T1 to step T7 in the server process of the second embodiment are the same as those in step T1 to step T7 in the server process of the first embodiment, except for the process of synchronizing config setting files (A)13a', (B)13b', . . . executed an specific intervals of time in step T0→ step TX.

Figure 12:
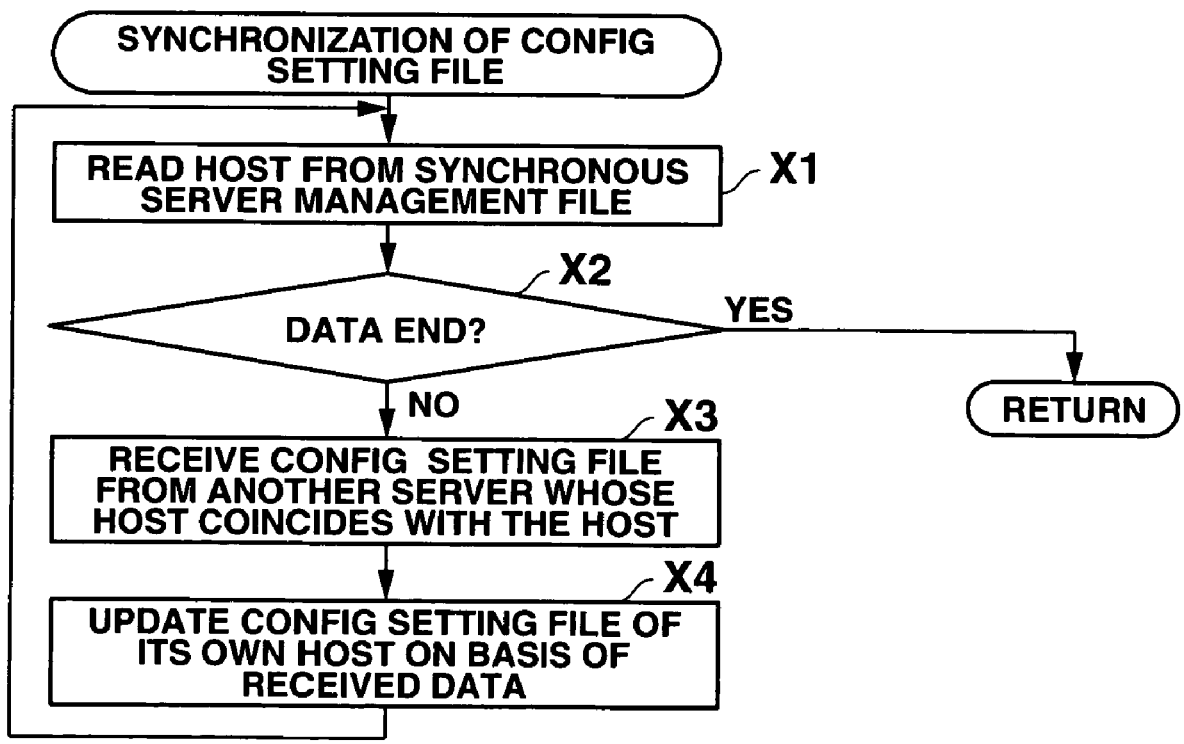
FIG. 12 is a flowchart to help explain a config setting file synchronizing process accompanying a server process in the SBC system of the second embodiment.

FIG. 12 is a flowchart to help explain a config setting file synchronizing process accompanying a server process in the SBC system of the second embodiment.

The config setting file synchronizing process is carried out independently in each of the server units (A)11a, (B)11b, . . . . For example, when the config setting file synchronizing process is activated at the server unit (A)11a, the [host] IP addresses of the server units (A)11a, (B)11b, . . . and the host type flags indicating whether the IP address is the [host] IP address of the server (A)11a or the [host] IP address of one of the other server units (B)11b, (C)11c, . . . written in the synchronous server management file 17a (see FIG. 10) are read in sequence (steps X1 and X2).

Then, according to the [host] IP address of each of the other server units (B)11b, (C)11c, . . . whose host type flag is set to "0," the config setting files 13b', 13c', . . . included in the other server units (B)11b, (C)11c, . . . are received and acquired in sequence (step X3). According to this, the contents of the config setting file 13a' included in the server unit (A)11a are updated (step X4).

Such a config setting file synchronizing process is carried out independently in each of the server units (A)11a, (B)11b, . . . , which makes it possible to synchronize and unify information (including the application name, path and file name, and desktop image file) about the application of each of the server units (A)11a, (B)11b, . . . written in the config setting files 13a', 13b', . . . at all the server units (A)11a, (B)11b, . . . , even if, for example, the application is updated, such as added, deleted, or changed, at any server unit (n)11n.

The flowchart for the terminal process accompanying the client-server connection in the SBC system of the second embodiment is the same as the flowchart of the first embodiment of FIG. 3, except that the process (step S10) of creating and displaying an application selection screen (A1 to An) when application tabs Aa to Af caused to correspond to, for example, the server units (A)11a, (B)11b, . . . in step S6 are selected and the process (step S9) of creating and transmitting an application run command selected on the application selection screen (step S11) differ from those in the first embodiment as explained below.

Specifically, for example, when the client terminal (1)12a makes an initial connection with the server unit (A)11a and its config setting file 13a' (see FIG. 9) is received and stored in the client terminal (1)12a (steps S1 to S5) and thereafter the application tab Ab (see FIG. 7) corresponding to the server unit (B)11b is selected (step S6), the initial (desktop) image file of each application is read from information [host02: application: . . . ] about the application corresponding to the server unit (B)11b in the config reception data 14' and is displayed in list form as an application selection screen (Ab1 to Ab6) as shown in, for example, FIG. 7(A) (step S6 → step S10).

On the application selection screen (Ab1 to Ab6) corresponding to the server unit (B)11b, when the user operates to select and specify, for example, the application screen Ab2 (step S11), a command for making a connection with the server unit (B)11b and activating and executing the application is generated and transmitted (step S9) according to IP address of the server unit (B) [host02]11b and the path and file name [shell:] of the application read from the config reception data 14' (see FIG. 9) according to the image file on the application screen Ab2.

At this time, the user account [LOGIN:] and password [PASSWD:] input and stored in step S3 are added to the command for making a connection with the server unit (B)11b and activating and executing the application. Then, the resulting command is transmitted.

Then, in response to the transmission of the command for making a connection with the server unit (B)11b and activating and executing the application Ab2 to the server unit (B)11b (step T6→ step T7), an initial screen of the selected application Ab2 received from the server unit (B)11b is received and displayed as shown in FIG. 7(B) (step S15).

In the SBC system, for example, when the client terminal (1)12a makes an initial connection with the server unit (A)11a, the connect execution command, together with an authentication request including user account [LOGIN:] and user password [PASSWD:], is transmitted (steps S1 to S4) and a connection authenticating process is carried out on the server unit (A)11a side (steps T1 to T5), and thereafter, when a command for making a connection with another server unit (n)11n and executing the application is transmitted according to the selection of the application each server unit has on the application selection screen (Ab1 to Ab6) (steps S10, S11, and S9), for example, an authentication request is not transmitted because of the same network 10 and another server unit (n)11n which has received the execution command of the selected application omits the authentication process and immediately carries out the process of dealing with the command. However, even on the same network 10, an execution command to which an authentication request including user account [LOGIN:] and user password [PASSWD:] stored in step S3 have been added may be transmitted each time the connection is switched to another server unit (n)11n, and an authentication process may be carried out at the destination server unit (n)11n.

Then, when the user performs an input operation corresponding to the function of the application according to the application screen Ab2 (see FIG. 7(B)) from the server unit (B)11b received and displayed at the client terminal (1)12a, a display screen corresponding to the user operation received from the server unit (B)11b is displayed (step S16) in response to the transmission of the input operation signal to the server unit (B)11b (step T6 → step T7), which enables the user to execute an arbitrary application process.

The process (steps S6 to S9, S12, and S13) of directly selecting and connecting with the server units (A)11a to (F)11f according to the display of a desktop image of selection list screen (D1 to D6) (see FIG. 6) corresponding to the respective server units (A)11a to (F)11f and the process (steps S14 to S18) of running the application at the selected server unit (n)11n are the same as those in the first embodiment. Therefore, an explanation of them will be omitted.

Accordingly, in the process of controlling the client-server connection in the SBC system of the second embodiment, the application names, path and files names, and desktop image files of all the applications each of the server units (A)11*a*, (B)11*b*, . . . has are written equally and synchronized in the config setting files (A)13*a*', (B)13*b*', . . . included in the respective server units (A)11*a*, (B)11*b*, . . . . By doing this, not only can a desktop image of a selection list screen (D1 to D6) (see FIG. 6) for each of the server units (A)11*a* to (F)11*f* on the same network 10 be displayed, the server units (A)11*a* to (F)11*f* be directly specified and connected for use, but also a selection list screen (A1 to A*n*) (see FIG. 7) of the applications the server units (A)11*a* to (F)11*f* have can be displayed and the applications of the server units (A)11*a* to (F)11*f* can be directly selected, specified, connected, and activated as in the SBC system of the first embodiment.

In this case, on the network 10 of the SBC system of the second embodiment, the storage server 15 is connected and the common disk 16 is provided. Then, various data files created by executing the application files of the server units (A)11*a*, (B)11*b*, . . . at the client terminals (1)12*a*, (2)12*b*, . . . are collectively stored and managed at the common disk 16 for each of the user accounts u1, u2, . . . . Accordingly, it is possible to store and manage the data files of the same user created by running applications of the same type as a common data file even in the different server units (A)11*a*, (B)11*b*, . . . .

Third Embodiment

Figure 13:
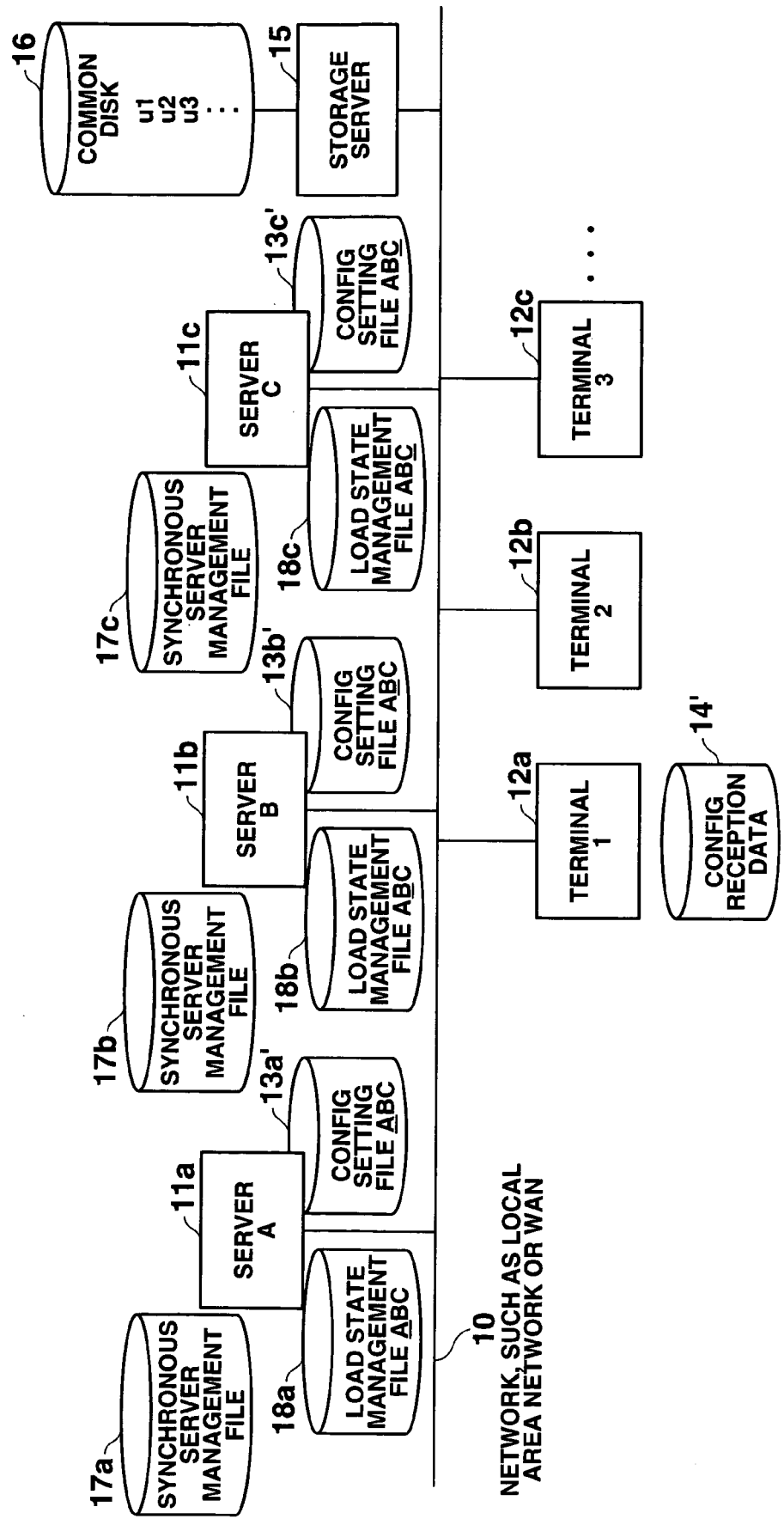
FIG. 13 is a block diagram showing the configuration of an SBC system according to a third embodiment of a computer system of the present invention.

FIG. 13 is a block diagram showing the configuration of an SBC system according to a third embodiment of a computer system of the present invention.

In the SBC system of the third embodiment in FIG. 13, the same component parts as those of the SBC system of the second embodiment in FIG. 8 are indicated by the same reference numerals and an explanation of them will be omitted.

The SBC system of the third embodiment is such that the server units (A)11*a*, (B)11*b*, . . . on the network 10 are provided with load state management files 18*a*, 18*b*, . . . for storing and managing the states of the operating loads of the server units (A)11*a*, (B)11*b*, . . . , respectively, in the SBC system of the second embodiment in FIG. 8.

FIG. 14 shows the contents of a load state management file 18*a* included in the server unit (A)11*a* of the SBC system according to the third embodiment.

In the load state management file 18*a*, the sum total of a value representing the degree of a CPU load on each of the hosts so as to correspond to IP addresses of the hosts composed of the server units (A)11*a*, (B)11*b*, . . . , a value representing the degree of memory swap, a value representing the degree of communication traffic, a value representing the frequency of disk use, and a value representing each load is updated at regular intervals of time and is stored. At the same time, the sum totals representing the load states for the individual server units (A)11*a*, (B)11*b*, . . . are determined in ascending order of priority and are stored.

Specifically, in the load state management file 18*a*, the present operating load state of the server unit (A)11*a* including the management file 18*a* and the present operating load states of the other server units (B)11*b*, (C)11*c*, . . . are digitized and the resulting values are stored and managed. Then, the server units are listed in ascending order of load. The other server units (B)11*b*, (C)11*c*, . . . are also provided with load state management files 18*b*, 18*c*, . . . of the same contents, respectively.

Then, in the SBC system of the third embodiment, for example, when a run command of the application selected according to the display of the application selection screen (see FIG. 7) at the client terminal (1)12*a* is transmitted to the server unit (A)11*a* with which the client terminal (1)12*a* made an initial connection according to the config reception data 14' (see FIG. 9), the server unit (A)11*a* determines a server unit (n)11*n* with the lightest operating load at present from the contents of the load state management file 18*a* (see FIG. 14) and informs the client terminal (1)12*a* of the change of the connection to the server unit (n)11*n* with the lightest load at present (Host change).

Then, the client terminal (1)12*a* re-creates a run command of an application of the same type selected according to the application selection screen as an application run command for the server unit (n)11*n* with the lightest load at present informed by the server unit (A)11*a* initially connected and transmits the resulting command.

This enables the user to cause the server unit (n)11*a* with the lightest load to be automatically selected and therefore quickly activate and execute the desired application without regard to which one of the server units (A)11*a*, (B)11*c*, . . . has the lightest or heaviest load.

Next, the process of controlling client-server connection in the SBC system of the third embodiment configured as described above will be explained.

Figure 15:
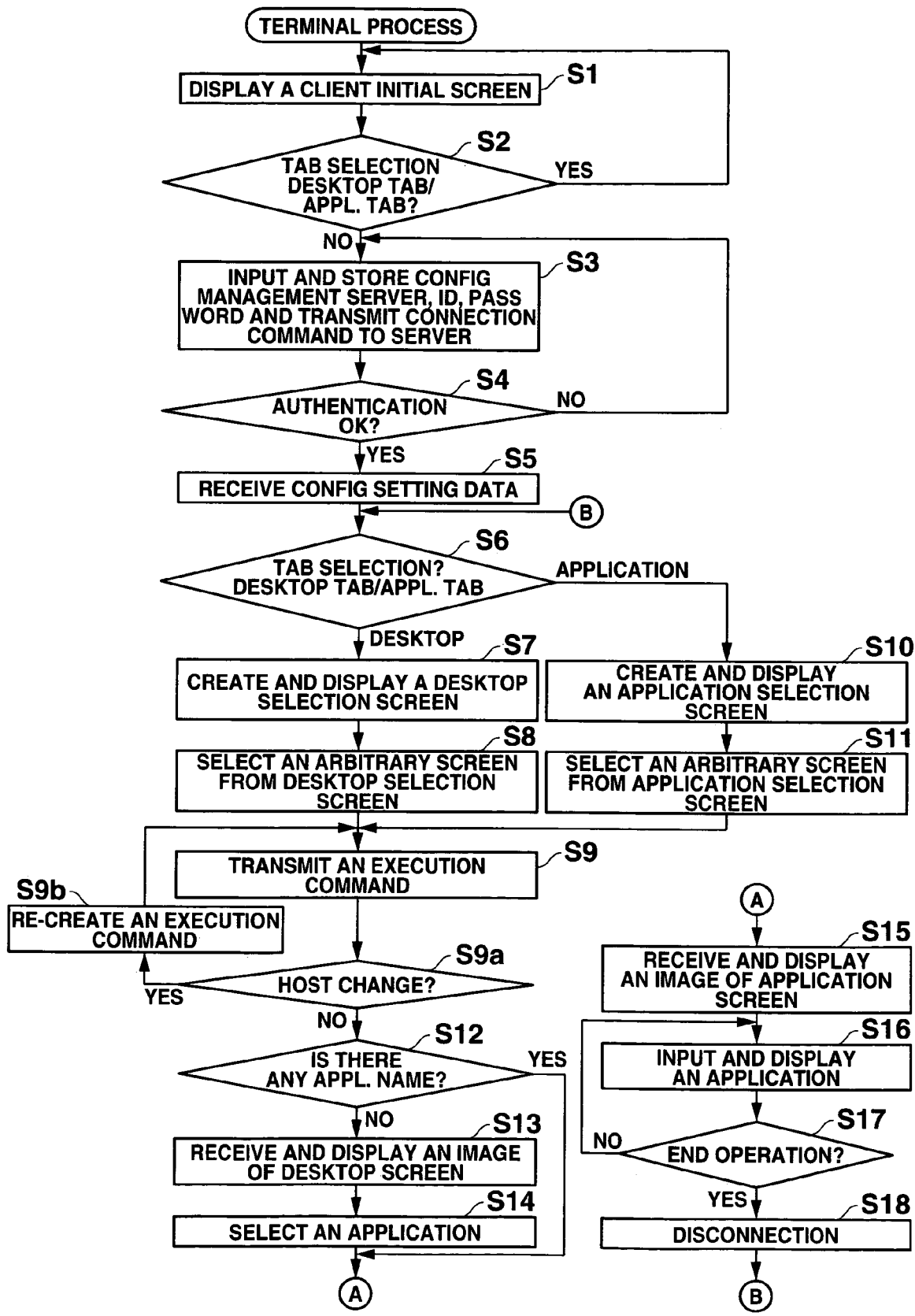
FIG. 15 is a flowchart to help explain a terminal process accompanying client-server connection in the SBC system of the third embodiment.

FIG. 15 is a flowchart to help explain a terminal process accompanying client-server connection in the SBC system of the third embodiment.

Figure 16:
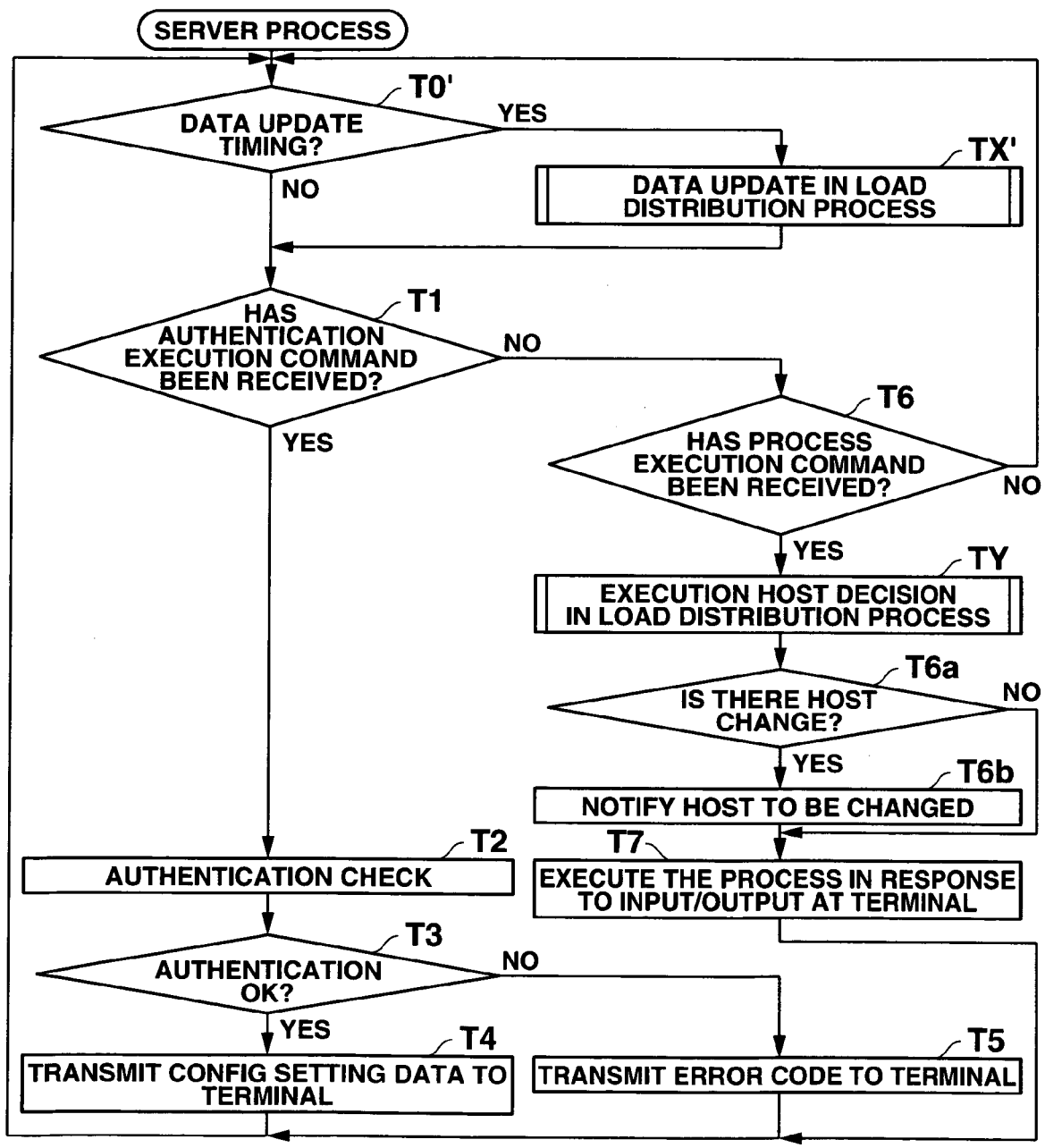
FIG. 16 is a flowchart to help explain a server process accompanying client-server connection in the SBC system of the third embodiment.

FIG. 16 is a flowchart to help explain a server process accompanying client-server connection in the SBC system of the third embodiment.

The terminal process in the SBC system of the third embodiment differs from the terminal process explained in the second embodiment in steps S9*a* and S9*b*. Moreover, the server process of the third embodiment differs from the server process explained in the second embodiment in steps T0', TX', TY, T6*a*, and T6*b*.

Figure 17:
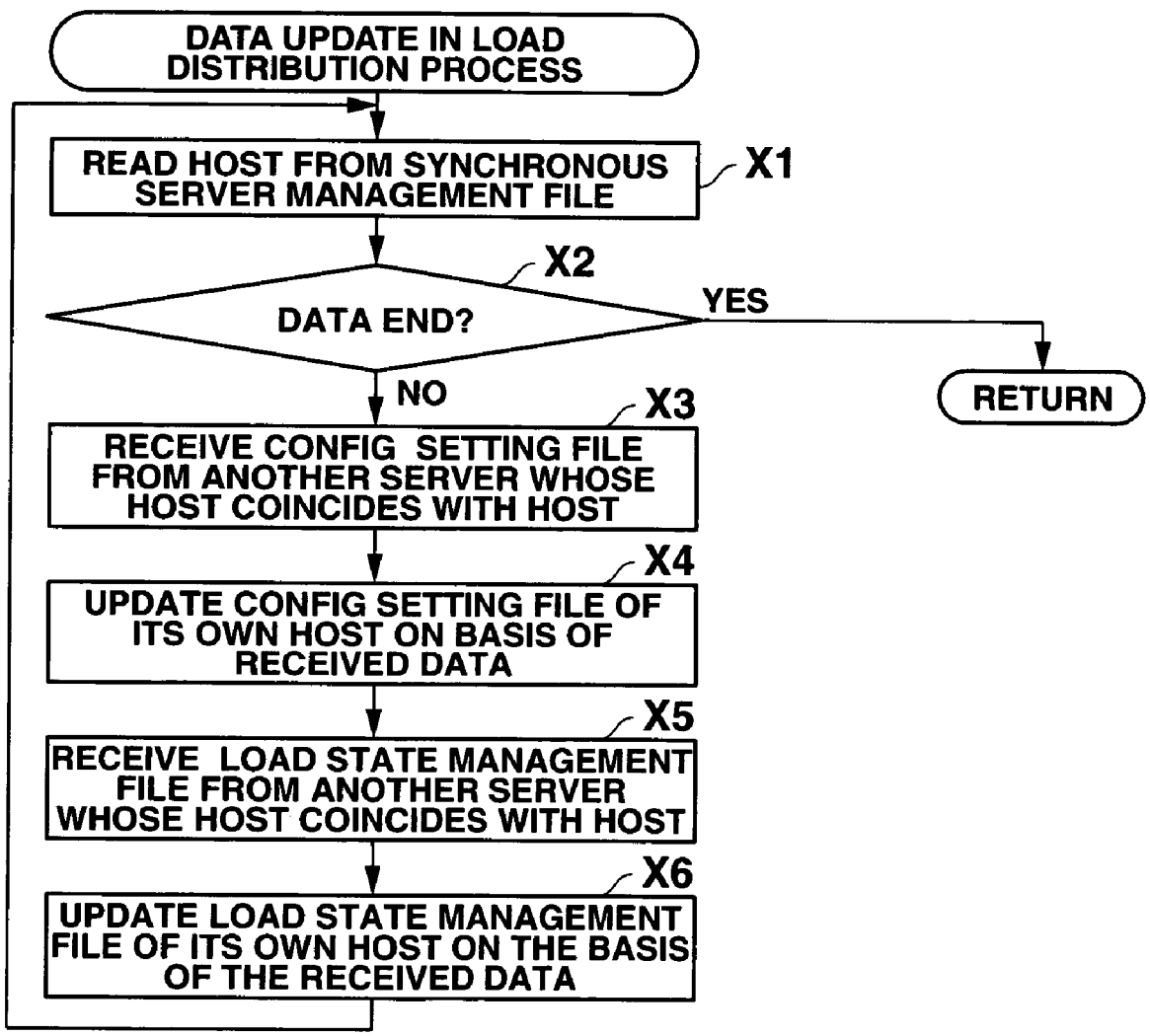
FIG. 17 is a flowchart to help explain a data update process in a load distribution process accompanying the server process in the SBC system of the third embodiment.

In the server process of the third embodiment, a data update process in a load distribution process of FIG. 17 is activated with data update timing at regular intervals of time (step T0' → step TX').

FIG. 17 is a flowchart to help explain a data update process in a load distribution process accompanying the server process in the SBC system of the third embodiment.

In the load distribution process, a data update process is carried out independently in each of the server units (A)11*a*, (B)11*b*, . . . . For example, when the data update process is activated in the server unit (A)11*a*, the [host] IP addresses of the server units (A)11*a*, (B)11*b*, . . . and the host type flags indicating whether the IP address is the [host] IP address of the server (A)11*a* or the [host] IP address of one of the other server units (B)11*b*, (C)11*c*, . . . written in the synchronous server management file 17*a* (see FIG. 10) are read in sequence (steps X1, and X2).

Then, according to the [host] IP address of each of the other server units (B)11*b*, (C)11*c*, . . . whose Host type flag is set to "0," the config setting files 13*b*', 13*c*', . . . included in the other server units (B)11*b*, (C)11*c*, . . . are received and acquired in sequence (step X3). According to this, the contents of the config setting file 13*a*' included in the server unit (A)11*a* are updated (step X4).

In such a data update process, first, the config setting file synchronizing process is carried out independently in each of the server units (A)11*a*, (B)11*b*, . . . , which makes it possible to synchronize and unify information (including the application name, path and file name, and desktop image file) about the application of each of the server units (A)11*a*, (B)11*b*, . . . written in the config setting files 13*a*', 13*b*', . . . at all the server units (A)11a, (B)11b, . . . , even if, for example, the application is updated, such as added, deleted, or changed, at any server unit (n)11n.

Then, after the config setting file synchronizing process has been carried out in step X1 to step X4, the load state management files 18b, 18c, . . . included in the other server units (B)11b, (C)11c, . . . are received and acquired in sequence (step X5) according to the [host] IP addresses of the other server units (B)11b, (C)11c, . . . whose host type flag is set to "0" read from the synchronous server management file 17a (see FIG. 10) in step X1. According to this, the contents of the load state management file 18a (see FIG. 14) are updated (step X4).

That is, the data update process of the load state management files 18a, 18b, . . . is carried out independently at the server units (A)11a, (B)11b, . . . , respectively. This enables each of the server units (A)11a, (B)11b, . . . to always determine the load state of each server unit and which one of the server units has the lightest operating load at present.

Then, for example, after steps S10 and S11 in the terminal process at the client terminal (1)12a, when the user has selected the desired application on the application selection screen which displays in list form the desktop screens of the applications included in the server units (A)11a to (F)11f by switching between the application tabs Aa to Af as shown in, for example, FIG. 7 on the basis of the config reception data 14', an execution command of the selected application is created on the basis of the config reception data 14' and is transmitted to the corresponding server unit (n)11n (step S9).

Figure 18:
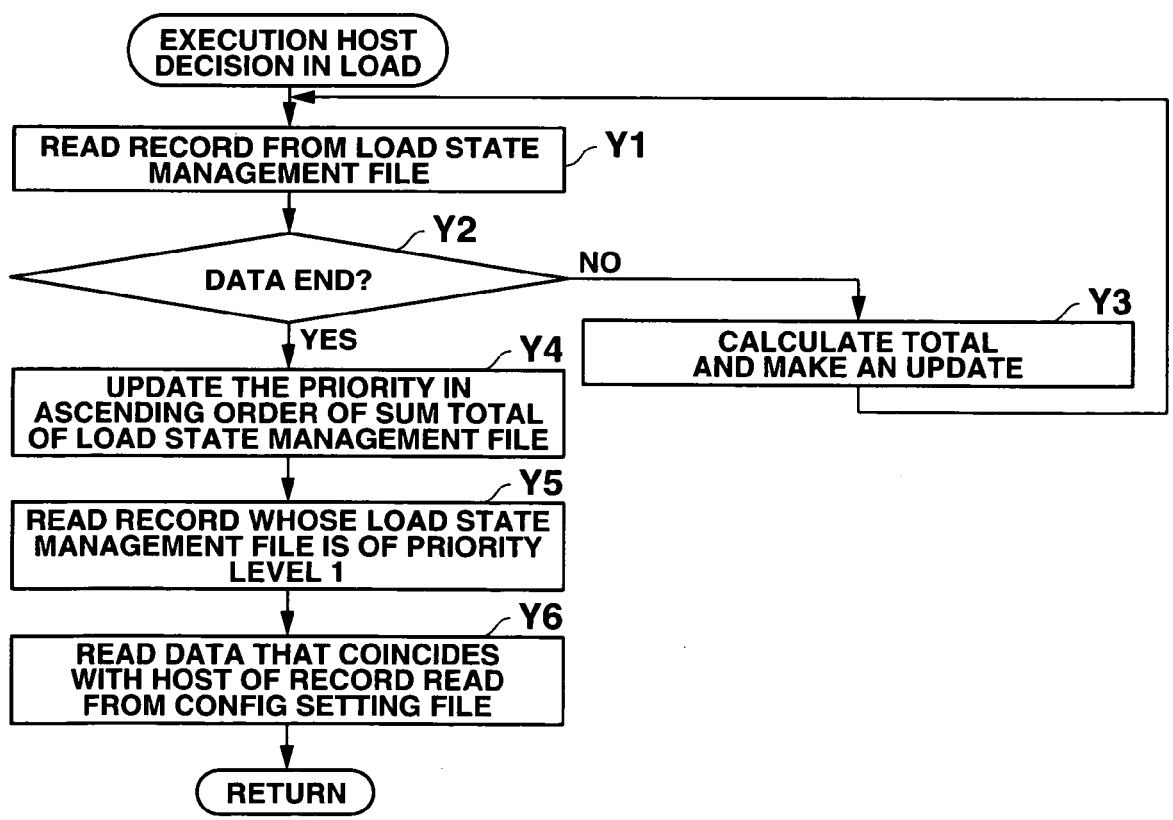
FIG. 18 is a flowchart to help explain an execution Host decision process in the load distribution process accompanying the server process in the SBC system of the third embodiment.

According to this, for example, when the server unit (B)11b has received the execution command of the application transmitted from the client terminal (1)12a (step T6), an execution host decision process (step TY) in the load distribution process of FIG. 18 is activated.

FIG. 18 is a flowchart to help explain an execution Host decision process in the load distribution process accompanying the server process in the SBC system of the third embodiment.

For example, at the server unit (B)11b which has received the execution command of the selected application from the client terminal (1)12a, when the execution host decision process (step TY) in the load distribution process is activated, the contents of the load state management file 18b at the time are read out (step Y1) and the sum total of the values representing various operating loads for each of the server units (A)11a, (B)11b, . . . is calculated and sequentially updated (step Y2→step Y3).

Then, the numbers in the order of priority are updated in ascending order of the sum total of operating loads for each of the updated server units (A)11a, (B)11b, . . . (step Y4) and the host IP address of the server unit (n)11n with priority number "1" is read out (step Y5).

Then, when the data in the config setting file 13b' which coincides with the host IP address read in step Y5 is read out and is determined to be config data for the server unit (n)11n whose preset operating load is the lightest (step Y6).

That is, in the execution host decision process in the load distribution process, it is determine which one of the server units is the server unit (n)11n with the lightest operating load at present. Consequently, it is determined whether host change is needed, depending on whether the server unit (n)11n whose operating load has been determined to be the lightest is the server unit (B)11b which has received the execution command of the selected application from the client terminal (1)12a (step T6a).

For example, if the server unit (n)11n whose present operating load has been determined to be the lightest is not the server unit (B)11b which has received the execution command of the selected application from the client terminal (1)12a and therefore it is determined that host change is needed (step T6a (Yes)), notice information about host change with the host IP address of the server unit (n)11n with the lightest operating load is transmitted to the client terminal (1)12a (step T6b).

Then, if it has been determined that host change is needed (step S9a (Yes)) because the client terminal (1)12a has received the host change notice information transmitted from the server unit (B)11b, the execution command is re-created (step S9b) on the basis of the host IP address of the server unit (n)11n with the lightest operating load at present shown in the host change notice information and information (including the application name, path and file name, and desktop image file) of the selected application written in the config reception data 14' (see FIG. 9) caused to correspond to the destination host. The resulting command is transmitted to the server unit (n)11n whose present operating load the lightest according to the IP address of the destination host (step S9).

At this time, the user account [LOGIN:] and password [PASSWD:] input and stored in step S3 are added to the command for making a connection with the destination host server unit (n)11n and executing the selected application. Then, the resulting command is transmitted.

Then, in response to the transmission of the command for making a connection with the destination Host server unit (n)11n and executing the selected application to the server unit (n)11n (step T6→ step TY, step T6a → step T7), the initial screen (see FIGS. 7(B) and 7(C)) of the selected application received from the server unit (n)11n is received and displayed (step S15).

Then, when the user has performed an input operation corresponding to the function of the application according to the initial screen (or desktop screen) of the selected application from the server unit (n)11n with the light operating load at present received and displayed at the client terminal (1)12a, a display screen corresponding to the user operation received from the server unit (n)11n is displayed (step S16) in response to the transmission of the input operation signal to the server unit (n)11n, which enables the user to cause the server unit (n)11n whose present operating load is the lightest to execute an arbitrary application process efficiently.

The process (steps S6 to S9, S12, and S13) of directly selecting and connecting with the server units (A)11a to (F)11f according to the display of a desktop image of selection list screen (D1 to D6) (see FIG. 6) corresponding to the respective server units (A)11a to (F)11f and the process (steps S14 to S18) of running the application at the selected server unit (n)11n are the same as those in the first embodiment. Therefore, an explanation of them will be omitted.

Accordingly, in the process of controlling the client-server connection in the SBC system of the third embodiment, the application names, the path and file names, and the desktop image files of all the applications each of the server units (A)11a, (B)11b, . . . has are written equally and synchronized in the config setting files (A)13a', (B)13b', . . . included in the respective server units (A)11a, (B)11b, . . . and further the load state management files 18a, 18b, . . . are provided to make it possible to always get hold of the server unit (n)11n whose present operating load is the lightest. By doing this, not only can a desktop image of a selection list screen (D1 to D6) (see FIG. 6) for each of the server units (A)11a to (F)11f on the same network 10 be displayed and the server units (A)11a to (F)11f be directly specified and connected for use as in the SBC system of the first embodiment, but also a selection list screen (A1 to An) (see FIG. 7) of the applications the server units (A)11a to (F)11f have can be displayed and the applications of the server units (A)11a to (F)11f can be directly selected, specified, connected, and activated. In addition to this, the unit for activating the selected application may be switched to the server unit (n)11n whose present operating load is the lightest, which enables the selected application to be run efficiently.

In this case, on the network 10 of the SBC system of the third embodiment, too, the storage server 15 is connected and the common disk 16 is provided. Then, various data files created by executing the application files of the server units (A)11a, (B)11b, . . . at the client terminals (1)12a, (2)12b, . . . are collectively stored and managed at the common disk 16 for each of the user accounts u1, u2, . . . . Accordingly, it is possible to store and manage the data files of the same user created by running applications of the same type as a common data file even in the different server units (A)11a, (B)11b, . . . .

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system in which a plurality of server units and a plurality of terminal units are connected via a network and application software is consolidated on the server units, each of the server units comprising:
specific file storage means for storing a specific file in which information on connection with each of said plurality of server units, information on a desktop image corresponding to each of said plurality of server units, information on specification of an application functioning on the server unit, and information on an image of an initial screen have been written;
specific file transmitting means for transmitting the specific file stored by the specific file storage means to a connecting terminal unit as a result of connection with the terminal unit; and
application running means for running the functioning application when receiving from the terminal unit a run command for an application complying with information on the specification of the application functioning on the present server unit, and each of the terminal units comprising:
specific file reception storage means for storing the specific file received in response to the connection with the server unit;
desktop list display control means for displaying, in list form, desktop images corresponding to said plurality of server units in a one-to-one correspondence based on a description of the specific file stored by the specific file reception storage means;
connection command transmitting means for, when the desktop images corresponding to said plurality of server units in the one-to-one correspondence displayed in list form by the desktop list display control means are specified according to user operation, transmitting a connection command to the server unit according to connection information on the server unit written in the specific file stored by the specific file reception storage means in compliance with the specified desktop image;
application list display control means for displaying, in list form, initial screen images of the application functioning on the server unit based on the description of the specific file stored by the specific file reception storage means; and
run command transmitting means for, when the initial screen images of the application displayed in list form by the application list display control means are specified according to a user operation, transmitting the run command for the application to the server unit according to information on the specification of the application written in the specific file stored by the specific file reception storage means in conformity to an initial screen image of a specified application.

2. The computer system according to claim 1, wherein;
the specific file storage means in the server unit stores a specific file in which information on the connection with each of said plurality of server units, information on the desktop images corresponding to said plurality of server units in the one-to-one correspondence, information on the specification of an application functioning with each of said plurality of server units, and information on its initial screen image have been written,
the application list display control means in the terminal unit displays, in list form, the initial screen image of the application functioning with each of said plurality of server units based on the description of the specific file stored by the specific file reception storage means, and
the run command transmitting means, when the initial screen image of the application functioning with each of said plurality of server units displayed in list form by the application list display control means is specified according to a user operation, transmits the run command for the application involving the connection with the server unit according to information on the specification of the application written in the specific file stored by the specific file reception storage means in compliance with the initial screen image of the specified application and information on the connection with the server unit.

3. The computer system according to claim 2, wherein the server unit further comprises specific file synchronizing means for synchronizing descriptive content of the specific file stored by the specific file storage means with a specific file stored by the specific file storage means of another server unit on the network.

4. The computer system according to claim 3, wherein the server unit further comprises:
server load management means for managing a load state of each of said plurality of server units on the network and recording a server unit with a lightest load,
lightest load server decision means for, when the run command for the application complying with information on the specification of the application functioning with the present server unit is received from the terminal unit, determining whether the server unit with the lightest load managed by the server load management means is the present server unit or one other server unit, and
server change notice means for, when the lightest load server decision means has determined that the server unit with the lightest load is the one other server unit, informing the terminal unit of change of the server unit as well as information on the connection with the one other server unit written in the specific file stored by the specific file storage means, and
wherein the application running means, when the lightest load server decision means has determined that the server unit with the lightest load is the present server unit, runs the application according to the run command for the application received from the terminal unit, and wherein the terminal unit further comprises run command retransmitting means for, when being informed of the change of the server unit by the server change notice means in the server unit, re-creating and transmitting the run command for the application involving the connection with the server unit in compliance with information on the connection with the server unit informed of the change and information on specification of the specified application in the server unit informed of the change written in the specific file stored by the specific file reception storage means.

5. The computer system according to any one of claim 2 to claim 4, further comprising common storage means which is connected equally to said plurality of server units on the network and stores files created by running an application in each of said plurality of server units in such a manner that the files correspond to user identification data.

6. A terminal unit in a computer system in which a plurality of server units and a plurality of terminal units are connected via a network and application software is consolidated on the server units, the terminal unit comprising:

specific file reception storage means for storing a specific file which is received in response to connection with a server unit and in which information on connection with each of said plurality of server units, information on desktop images corresponding to said plurality of server units in a one-to-one correspondence, information on specification of an application functioning with the server unit, and information on an initial screen image have been written;

desktop list display control means for displaying, in list form the desktop images corresponding to said plurality of server units in the one-to-one correspondence based on description of the specific file stored by the specific file reception storage means;

connection command transmitting means for, when the desktop images corresponding to said plurality of server units in the one-to-one correspondence displayed in list form by the desktop list display control means are specified according to a user operation, transmitting a connection command to the server unit according to connection information on the server unit written in the specific file stored by the specific file reception storage means in compliance with the specified desktop image;

application list display control means for displaying, in list form, initial screen images of the application functioning on the server unit based on the description of the specific file stored by the specific file reception storage means; and run command transmitting means for, when the initial screen images of the application displayed in list form by the application list display control means are specified according to a user operation, transmitting a run command for the application to the server unit according to information on the specification of the application written in the specific file stored by the specific file reception storage means in conformity to an initial screen image of a specified application.

* * * * *